Jan. 22, 1957  D. L. MORGAN  2,778,573
THERMOSTATIC STEAM TRAP
Filed Oct. 31, 1955
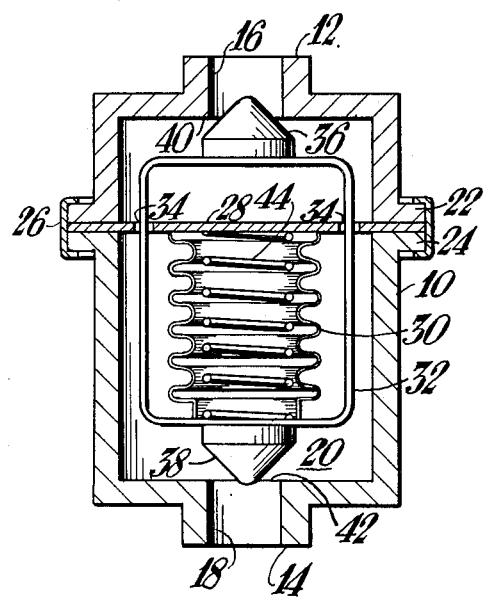
INVENTOR.
DAVID L. MORGAN.
BY
HIS ATTORNEY.

United States Patent Office 2,778,573
Patented Jan. 22, 1957

2,778,573

THERMOSTATIC STEAM TRAP

David L. Morgan, Shelton, Conn., assignor to Robertshaw-Fulton Controls Company, Greensburg, Pa., a corporation of Delaware Application October 31, 1955, Serial No. 543,968

2 Claims. (Cl. 236—56)

This invention relates to steam traps or condensation draining devices and more particularly to thermostatic control devices of this character.

In devices of the described type, an expansible element such as a bellows is used to actuate a valve member to control the flow of condensate from a steam line. The bellows in such devices is generally charged with a volatile liquid which, when the bellows is surrounded by steam, exists in a vaporous state, but when the bellows is surrounded by condensate or water, exists in a liquid state. As long as steam alone surrounds the bellows, the fluid within the bellows will be at the same temperature as the steam around it, but when even a small amount of condensate collects around the bellows, there is an instant flow of heat from the vapor inside the bellows to the condensate outside. The flow of heat causes the vapor within the bellows to condense, thereby causing contraction of the same. The bellows is usually connected with the valve member whereby the valve member will be opened upon said contraction of the bellows releasing the condensate.

In steam traps of the above described type, damage to the bellows often occurs when, upon rapid filling of the trap with condensate, the valve is opened faster than the condensate can flow from the outlet of the trap resulting in a pressure being exerted on the outside of the bellows much higher than the pressure of the charge inside the bellows. Excessive pressure conditions may also result from water hammer or the sudden opening of a line valve. Such conditions generally result in the bellows being permanently deformed or bent whereby the calibration of the trap is destroyed.

One common means of preventing damage to the bellows is to fill the bellows so that when cold, it is completely full of volatile liquid. While this is effective in preventing pressure damage, it results in slow response of the bellows due to the large amount of fluid that must be heated and cooled.

It is an object of this invention to protect a steam trap from excessive pressure conditions without limiting the response of the same to temperature conditions.

Another object of this invention is to incorporate in a steam trap an expansible actuating member which is responsive to both pressure and temperature conditions.

Another object of this invention is to make a steam trap self-protective against excessive pressure conditions.

In one preferred embodiment of the invention, a casing is provided with a chamber and an inlet passage and an outlet passage in communication with the chamber. The inlet and outlet passages define a pair of valve seats which are cooperable with a pair of valve members respectively for selectively controlling flow of fluid in said passages. An expansible member containing a volatile liquid is operatively connected to said valve members and is operative when affected by temperature variations to position the same to control said outlet passage but is operative when affected by excessive pressures to position said valve members to control said inlet passage.

Other objects and advantages will become apparent from the following description taken in connection with the accompanying drawing which is a longitudinal sectional view of a steam trap embodying this invention.

Referring more particularly to the drawing, the steam trap includes a casing 10 having an inlet 12 adapted to be connected to a steam pipe or the like requiring draining and an outlet 14 which may be connected to a discharge or drain pipe. The inlet 12 and outlet 14 define a pair of oppositely disposed concentric passages 16 and 18 respectively which communicate with the opposite ends respectively of a valve chamber 20 within the casing 10.

The casing 10 may be of unitary construction or formed as shown in two parts having mating flanges 22 and 24 which are secured by means of an annular clamp 26. A flat, non-circular supporting member 28 is interposed between the flanges 22 and 24 and extends across the chamber 20 to provide a mounting means for a temperature responsive means now to be described.

The temperature responsive means takes the form of an expansible and contractible bellows member 30 extending axially of the casing 10 and having one end fixed and sealed to the supporting member 28 and the other end thereof freely movable toward the outlet 14. The bellows member 30 is of conventional form and is preferably charged with a volatile fluid which will change from a liquid to a vaporous state and generate pressure within the bellows member 30 to expand the same whenever the bellows is subjected to heating by steam in the chamber 20. However, a small amount of condensate touching the walls of the bellows member 30 will cause sufficient flow of heat from the volatile fluid to condense the same and contract the bellows member 30.

The bellows member 30 is connected to a valve means and is operative to position the same to control the inlet 12 and outlet 14 upon expansion and contraction thereof. To this end, the free end of the bellows member 30 carries a strap 32 of generally rectangular configuration defining two oppositely disposed end walls and parallel side walls. The side walls of the strap 32 extend slidably through in two spaced slots 34, 34 formed in the support 28 and which maintain axial alignment of the strap 32 with the chamber 20 and permit reciprocable movement of the strap 32 between the inlet 12 and outlet 14.

The opposite end walls of the strap 32 carry two oppositely disposed valve members 36 and 38 respectively of the conical plug type. The upper valve member 36 is engageable with an annular shoulder 40 defined by the inner end wall of the inlet passage 16. The valve member 38 is similarly engageable with a shoulder 42 defined by the inner end wall of the outlet passage 18 for controlling the flow of fluid therethrough. The valve members 36, 38 are thus positioned for selective operation whereby movement of one of said valve members 36, 38 toward its associated seating surface will cause movement of the other of said valve members 36, 38 away from its associated seating surface.

The free end of the bellows member 30 is attached to the lower end wall of the strap 32 and is operative upon expansion and contraction thereof to position the strap 32 and the valve members 36 and 38 between the above described operative positions. A spring 44 is preferably mounted in compression interiorly of the bellows member 30 between the support 28 and strap 32 and is operative to exert a biasing force on the free end of the bellows 30 during excessive contraction thereof as will become apparent.

*Operation*

If the chamber 20 is filled with steam, the fluid within the bellows member 30 will be in a gaseous state, and the bellows member 30 will be expanded thus positioning the strap 32 whereby the valve member 38 engages the valve seat 42. In this position of the strap 32, the outlet 14 is closed while full flow is permitted through the inlet 12 since valve member 36 is out of engagement with the seat 40.

As long as the fluid contacting the walls of the bellows member 30 remains in the form of steam, the outlet 14 will remain closed. However, should even a small amount of condensate collect around the bellows member 30, there will be an instant flow of heat from the vapor within the bellows member 30 to the condensate surrounding the same. This flow of heat causes the vapor to condense thereby causing contraction of the bellows member 30. Contraction of the bellows member 30 effects movement of the strap 32 toward the inlet 12 to a position wherein both of said valve members 36 and 38 are disengaged from their associated valve seats 40 and 42 respectively. The outlet 14 is thus opened and condensate flows from the chamber 20 into the discharge pipe or conduit to which the outlet 14 is connected.

When the condensate has all been drained from the chamber 20, the liquid within the bellows will vaporize in response to heating by the surrounding steam whereupon the bellows member 30 will expand and return the strap 32 to its initial position wherein the valve member 38 engages the seat 42.

If, during the above described operation of the device, a build-up of pressure should occur in the chamber 20 which is greater than the pressure of the fluid within the bellows member 30 then the bellows member 30 will be contracted more than would ordinarily occur from mere condensation of the vapor within the bellows member 30. Any such abnormal contraction on the part of the bellows member 30 will move the strap 32 and valve member 36 to partially close the inlet 12 and limit the flow into the chamber 20. Upon sufficient contraction of the bellows member 30, the valve member 36 will engage the seat 40 and prevent further flow of fluid into the chamber 20. This closing of the inlet 12 upon excessive contraction of the bellows member 30 results in movement of the valve member 38 farther from the seat 42 thereby allowing maximum flow through the outlet 14 during such excessive pressure while at the same time cutting off the flow through the inlet 12.

The bellows member 30 is thus responsive to both temperature and pressure conditions within the chamber 20 and accordingly enables the device to be self-protecting against excessive pressure conditions, such as a result of water hammer or the sudden opening of a valve in the steam line.

Although the invention has particular utility in connection with a thermostatic steam trap, it will be apparent that the invention is not limited to this particular application, but may be incorporated in any control device requiring protection or response to a plurality of conditions.

While only one embodiment of the invention has been herein shown and described, it will be apparent to those skilled in the art that the construction and arrangement of parts may be in other ways variously embodied or changed without departing from the scope of the invention as defined in the appended claims.

It is claimed and desired to secure by Letters Patent:

1. A steam trap comprising a casing having an inlet and an outlet passage at opposite ends thereof communicating with a chamber intermediate said passages, a pair of oppositely disposed valve seats adjacent said passages respectively, a relatively fixed support extending across said chamber, a strap member guided by said support and having opposite ends extending adjacent said opposite ends of said casing, a pair of valve members carried by said strap member and being cooperable with said valve seats respectively for controlling flow through said passages, and an expansible and contractible element containing a volatile fluid and mounted between said support and one end of said strap member, said element being responsive to temperature variations of the fluid in said chamber for positioning said valve members relative to said seats, said element being also responsive to pressure variations in said chamber for positioning said valve members relative to said seats.

2. A steam trap as claimed in claim 1 wherein said element is constructed and arranged for causing one of said valve members to close said outlet passage under one temperature condition and to open said outlet under another temperature condition, said element being also constructed and arranged for causing the other of said valve members to close said inlet under one pressure condition.

References Cited in the file of this patent

UNITED STATES PATENTS

| | | |
|---|---|---|
| 1,976,730 | Irwin | Oct. 16, 1934 |
| 2,271,644 | Jaynes | Feb. 3, 1942 |
| 2,419,980 | Worth | May 6, 1947 |

FOREIGN PATENTS

| | | |
|---|---|---|
| 303,754 | Great Britain | Dec. 12, 1929 |
| 421,900 | Great Britain | Jan. 2, 1935 |
| 474,525 | Germany | Apr. 6, 1929 |